US012020631B2

(12) United States Patent
Huang et al.

(10) Patent No.: US 12,020,631 B2
(45) Date of Patent: *Jun. 25, 2024

(54) DISPLAY PANEL AND DISPLAY DEVICE

(71) Applicant: Xiamen Tianma Display Technology Co., Ltd., Xiamen (CN)

(72) Inventors: Wanming Huang, Xiamen (CN); Jieliang Li, Xiamen (CN); Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,405

(22) Filed: Mar. 31, 2023

(65) Prior Publication Data

US 2023/0245618 A1 Aug. 3, 2023

Related U.S. Application Data

(63) Continuation of application No. 17/646,610, filed on Dec. 30, 2021, now Pat. No. 11,663,957.

(30) Foreign Application Priority Data

Sep. 14, 2021 (CN) ............................ 202111076370

(51) Int. Cl.
*G09G 3/32* (2016.01)

(52) U.S. Cl.
CPC ........ *G09G 3/32* (2013.01); *G09G 2300/0426* (2013.01); *G09G 2310/0243* (2013.01);
(Continued)

(58) Field of Classification Search
CPC .......... G09G 3/2018–2025; G09G 3/32–3291; G09G 2300/0421–043; G09G 2300/0809; G09G 2300/0842; G09G 2300/0861; G09G 2310/0243; G09G 2310/0247; G09G 2310/0267; G09G 2310/027; G09G 2310/0275; G09G 2310/04; G09G 2310/06; G09G 2310/08; G09G 2320/0247–0266
See application file for complete search history.

(56) References Cited

U.S. PATENT DOCUMENTS

2008/0106542 A1 5/2008 Park et al.
2010/0128022 A1 5/2010 Takada et al.
(Continued)

FOREIGN PATENT DOCUMENTS

CN 101739934 A 6/2010
CN 107464519 A 12/2017

*Primary Examiner* — Nathan Danielsen
(74) *Attorney, Agent, or Firm* — Anova Law Group, PLLC

(57) ABSTRACT

A display panel includes a pixel circuit, a driving circuit, and a clock signal line. The driving circuit is configured to provide a control signal to the pixel circuit. The clock signal line is configured to provide a clock signal for the driving circuit. A data refresh period of the pixel circuit includes a data writing stage and a holding stage, and the holding stage includes N stages arranged in sequence, N≥1. When the pixel circuit is operated in the data writing stage, a clock pulse frequency of the clock signal is a first frequency F1. When the pixel circuit is operated in the holding stage, in at least one stage of the N stages, the clock pulse frequency of the clock signal is a second frequency F2, F1>F2>0. The pixel circuit includes a driving transistor, a first transistor, and a second transistor.

20 Claims, 6 Drawing Sheets

(52) U.S. Cl.
CPC . *G09G 2310/0286* (2013.01); *G09G 2310/08* (2013.01); *G09G 2320/0247* (2013.01)

(56) References Cited

U.S. PATENT DOCUMENTS

| | | | |
|---|---|---|---|
| 2011/0187696 | A1 | 8/2011 | Slack et al. |
| 2011/0210949 | A1 | 9/2011 | Yamazaki et al. |
| 2015/0194121 | A1 | 7/2015 | Lee et al. |
| 2019/0340977 | A1 | 11/2019 | Park et al. |
| 2021/0327368 | A1 | 10/2021 | Park et al. |
| 2022/0059036 | A1 | 2/2022 | Sang et al. |

DISPLAY PANEL AND DISPLAY DEVICE

CROSS-REFERENCE TO RELATED APPLICATION

This application is a continuation of application Ser. No. 17/646,610, filed on Dec. 30, 2021, which claims the priority of Chinese Patent Application No. 202111076370.X, filed on Sep. 14, 2021, the content of which is incorporated by reference in its entirety.

TECHNICAL FIELD

The present disclosure generally relates to the field of display technology and, more particularly, relates to a display panel and a display device.

BACKGROUND

At present, display panels have been widely used in all aspects of people's daily life. For example, the display panel can be used as a display interaction module for various devices accordingly. When the display panel is in operation, the pixel units of the display panel are driven and controlled by the pixel circuit. However, currently, the output signal of the driving circuit is not stable because of the effects of the leakage current, etc.

Therefore, there is a need to provide a display panel and a display device with improved signal stability. The disclosed display panel and display device are directed to solve one or more problems set forth above and other problems in the arts.

SUMMARY

One aspect of the present disclosure provides a display panel. The display panel includes a display panel includes a pixel circuit, a driving circuit, and a clock signal line. The driving circuit is configured to provide a control signal to the pixel circuit. The clock signal line is configured to provide a clock signal for the driving circuit. A data refresh period of the pixel circuit includes a data writing stage and a holding stage, and the holding stage includes N stages arranged in sequence, N≥1. When the pixel circuit is operated in the data writing stage, a clock pulse frequency of the clock signal is a first frequency F1. When the pixel circuit is operated in the holding stage, in at least one stage of the N stages, the clock pulse frequency of the clock signal is a second frequency F2, F1>F2>0. The pixel circuit includes a driving transistor, a first transistor, and a second transistor. The driving circuit includes a first driving circuit and a second driving circuit. The first driving circuit is configured to provide a control signal to the first transistor. The second driving circuit is configured to provide a control signal to the second transistor. The clock signal line includes a first clock signal line and a second clock signal line. The first clock signal line is configured to provide a first clock signal to the first driving circuit. The second clock signal line is configured to provide a second clock signal to the second driving circuit. When the pixel circuit is operated in the holding stage, a time length when a clock pulse frequency of the first clock signal is the second frequency F2 is H1, a time length when a clock pulse frequency of the second clock signal is the second frequency F2 is H2, and H1≥H2≥0.

Another aspect of the present disclosure provides a display panel. The display panel includes a display panel includes a pixel circuit, a driving circuit, and a clock signal line. The driving circuit is configured to provide a control signal to the pixel circuit. The clock signal line is configured to provide a clock signal for the driving circuit. A data refresh period of the pixel circuit includes a holding stage, and the holding stage includes N stages arranged in sequence, N≥1. When the pixel circuit is operated in the holding stage, in at least one stage of the N stages, a clock pulse frequency of the clock signal is a second frequency F2, F2>0. The pixel circuit includes a driving transistor, a first transistor, and a second transistor. The driving circuit includes a first driving circuit and a second driving circuit. The first driving circuit is configured to provide a control signal to the first transistor. The second driving circuit is configured to provide a control signal to the second transistor. The clock signal line includes a first clock signal line and a second clock signal line. The first clock signal line is configured to provide a first clock signal to the first driving circuit. The second clock signal line is configured to provide a second clock signal to the second driving circuit. When the pixel circuit is operated in the holding stage, a time length when a clock pulse frequency of the first clock signal is the second frequency F2 is H1, a time length when a clock pulse frequency of the second clock signal is the second frequency F2 is H2, and H1>H2≥0.

Another aspect of the present disclosure provides a display panel. The display panel includes a display panel includes a pixel circuit, a driving circuit, and a clock signal line. The driving circuit is configured to provide a control signal to the pixel circuit. The clock signal line is configured to provide a clock signal for the driving circuit. A data refresh period of the pixel circuit includes a holding stage, and the holding stage includes N stages arranged in sequence, N≥1. When the pixel circuit is operated in the holding stage, in at least one stage of the N stages, a clock pulse frequency of the clock signal is a third frequency F3, F3=0. The pixel circuit includes a driving transistor, a first transistor, and a second transistor. The driving circuit includes a first driving circuit and a second driving circuit. The first driving circuit is configured to provide a control signal to the first transistor. The second driving circuit is configured to provide a control signal to the second transistor. The clock signal line includes a first clock signal line and a second clock signal line. The first clock signal line is configured to provide a first clock signal to the first driving circuit. The second clock signal line is configured to provide a second clock signal to the second driving circuit. When the pixel circuit is operated in the holding stage, a time length when a clock pulse frequency of the first clock signal is the third frequency F3 is H3, a time length when a clock pulse frequency of the second clock signal is the third frequency F3 is H4, and H4>H3≥0.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate the embodiments of the present disclosure, and together with the description are used to explain the principle of the present disclosure.

Figure 1:
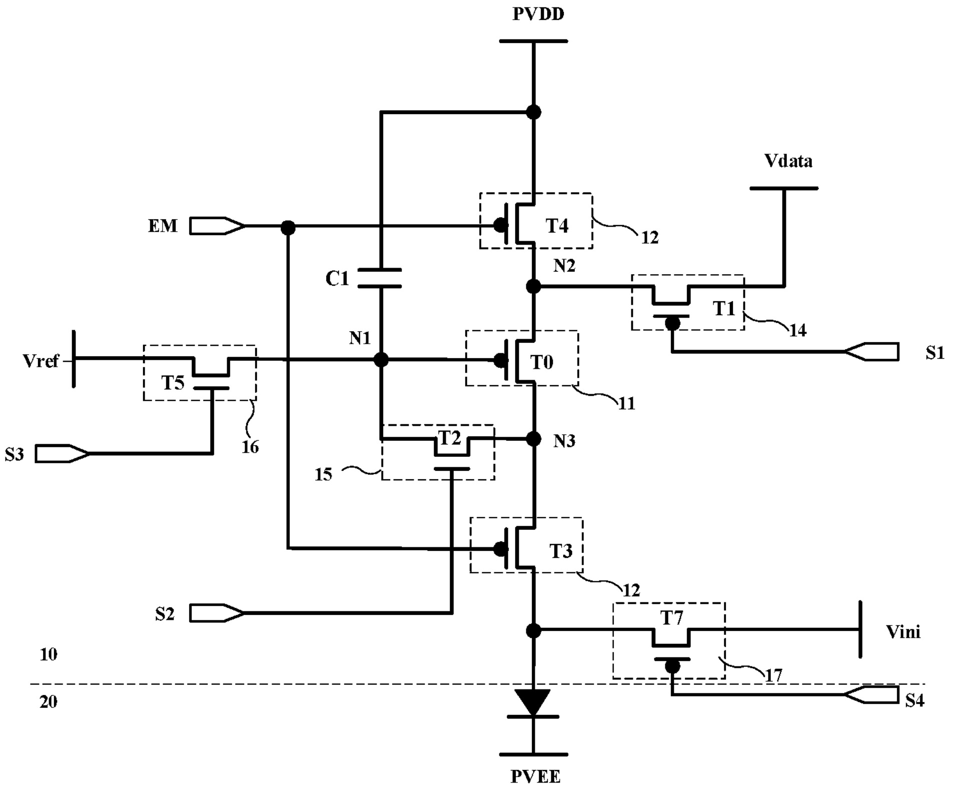
FIG. 1 illustrates a circuit structure of a pixel circuit and switch elements of an exemplary display panel according to various disclosed embodiments of the present disclosure.

In the drawings, the number for each component is as following: pixel circuit 10, light-emitting element 20, driving transistor T0, data writing module 14, compensation module 15, reset module 16, initialization module 17, first transistor T1, second transistor T2, third transistor T3, fourth transistor T4, fifth transistor T5, sixth transistor T6, seventh transistor T7, driving circuit 21, data signal Vdata, first scan signal S1, second scan signal S2, third scan signal S3, fourth scan signal S4, reset signal Vref, light-emission control signal EM, initialization signal Vini, first driving circuit 211, second driving circuit 212, clock signal CK, first clock signal CK1, and second clock signal CK2.

DETAILED DESCRIPTION

To make the objectives, technical solutions, and advantages of the present disclosure clearer, the following further describes the present disclosure in detail with reference to the accompanying drawings and embodiments. It should be understood that the specific embodiments described here are only used to explain the present disclosure, and are not used to limit the present disclosure.

It should be noted that the directions or positional relationships indicated by the terms “above”, “below”, “left”, or “right”, etc. are based on the directions or positional relationships shown in the drawings, and are only for ease of description, rather than indicating or implying that the device or element referred to must have a specific orientation, be constructed and operated in a specific orientation, and therefore cannot be understood as a limitation of this disclosure. The terms “first” and “second” are only used for ease of description and cannot be understood as indicating or implying relative importance or implicitly indicating the number of technical features. The meaning of “plurality” means two or more than two, unless otherwise specifically defined. In addition, the terms “horizontal”, “vertical”, “overhanging” and other terms do not mean that the component is required to be absolutely horizontal or overhanging but may be slightly inclined. For example, “horizontal” only means that its direction is more “horizontal” than “vertical”, it does not mean that the structure must be completely horizontal but can be slightly inclined.

It should also be noted that, unless otherwise clearly specified and limited, the terms “set”, “install”, and “connected” should be understood in a broad sense, for example, it can be a fixed connection or a detachable connection, or integrally connected. It can be a mechanical connection or an electrical connection; it can be directly connected, or indirectly connected through an intermediate medium, and it can be the internal communication between the two components. For those of ordinary skill in the art, the specific meaning of the above-mentioned terms in this disclosure can be understood under specific circumstances.

To illustrate the technical solutions of the present disclosure, detailed descriptions are given below in conjunction with specific drawings and embodiments.

With the development of display technology, display panels are widely used in various electronic devices, such as mobile phones, notebooks, and computers. FIG. 1 is a schematic diagram of a circuit structure of a pixel circuit and a light-emitting element of an exemplary display panel consistent with various disclosed embodiments of the present disclosure. As shown in FIG. 1, the display panel may include a pixel circuit 10 and a light-emitting element 20.

The light-emitting element 20 may be a light-emitting diode (LED), or an organic electroluminescence display (OLED, organic light-emitting semiconductor), etc.

The pixel circuit 10 may be configured to provide a driving current for the light-emitting element 20 of the display panel, and the pixel circuit 10 may also be connected to a data signal line (not shown). The data signal line may be configured to provide the data signal Vdata for the pixel circuit 10.

The pixel circuit 10 may include a driving module 11, and the driving module 11 may include a driving transistor T0. The gate electrode of the driving transistor T0 may receive the data signal Vdata written by the data signal line. When the pixel circuit 10 provides a driving current to the light-emitting element 20, the driving transistor T0 may actually serve as a core component of the pixel circuit 10 to generate a driving current.

The driving transistor T0 may be an oxide semiconductor transistor. For example, it may be an indium gallium zinc oxide (IGZO) transistor, or a silicon transistor, in particular, it may be a low temperature poly-silicon (LTPS) transistor, or others.

Referring to FIG. 1, in addition to the driving transistor T0, the pixel circuit 10 may also include a light-emitting control module 12, a data writing module 14, a compensation module 15, a reset module 16 and an initialization module 17.

The light-emitting control module 12 may be configured to selectively allow the light-emitting element 20 to enter the light-emitting stage. The light-emitting control module 12 may include a third transistor T3 and a fourth transistor T4.

The control terminals of the third transistor T3 and the fourth transistor T4 may be connected to a light-emitting control signal line (not shown) for receiving a light-emitting control signal EM.

When the light-emitting control signal line outputs a valid pulse (e.g., the light-emission control signal EM), the third transistor T3 and the fourth transistor T4 may be turned on for a conduction to drive the light-emitting element 20 into the light-emitting stage, and the driving current may flow into the light-emitting element 20 at this time. When the light-emitting control signal line outputs an invalid pulse, the third transistor T3 and the fourth transistor T4 may be turned off for a disconnection, and the path of the driving current flowing into the light-emitting element 20 may be disconnected.

The data writing module 14 may be used to selectively provide a data signal Vdata to the driving transistor T0. The data writing module 14 may include a first transistor T1. The drain electrode of the first transistor T1 may be connected to the source electrode of the driving transistor T0, the source electrode of the first transistor T1 may be connected to the data signal line and may receive the data signal Vdata, and the control terminal of the first transistor T1 may be connected to the first scan signal line and may be used to receive the first scan signal S1, and the first scan signal S1 may control the on/off of the first transistor T1.

The compensation module 15 may be connected between the gate electrode of the driving transistor T0 and the drain electrode of the driving transistor T0, and the compensation module 15 may be configured to compensate the threshold voltage of the driving transistor T0. The compensation module 15 may include a second transistor T2. The control terminal of the second transistor T2 may be connected to the second scan signal line and may receive the second scan signal S2. The second scan signal S2 may control the on/off of the second transistor T2.

The reset module 16 may be connected between the reset signal terminal and the gate electrode of the driving transistor T0, and the reset module 16 may be configured to provide a reset signal Vref for the gate electrode of the driving transistor T0. The reset module 16 may include a fifth transistor T5. The source electrode of the fifth transistor T5 may be connected to the reset signal terminal and may be used to receive the reset signal Vref, and the gate electrode of the fifth transistor T5 may be connected to the third scan signal line and may be configured for receiving the third scan signal S3.

The initialization module 17 may be connected between the initialization signal terminal and the light-emitting element 20, and may be configured to selectively provide the initialization signal Vini for the light-emitting element 20. The control terminal of the initialization module 17 may be connected to the fourth scan signal line for receiving the fourth scan signal S4.

In one embodiment, the initialization module 17 may include a seventh transistor T7. The source electrode of the seventh transistor T7 may be connected to the initialization signal terminal, the drain electrode of the seventh transistor T7 may be connected to the light-emitting element 20, and the gate electrode of the seventh transistor T7 may be connected to the fourth scan signal line. When the initialization module 17 is turned on, the pixel circuit 10 may enter an initialization phase.

It can be understood that, based on the optional circuit structure of the pixel circuit 10 and the light-emitting element 20 of the display panel shown in FIG. 1, to enable the pixel circuit 10 to provide the driving current to the light-emitting element 20 in an orderly manner, a driving circuit may be provided in the display panel.

Figure 2:
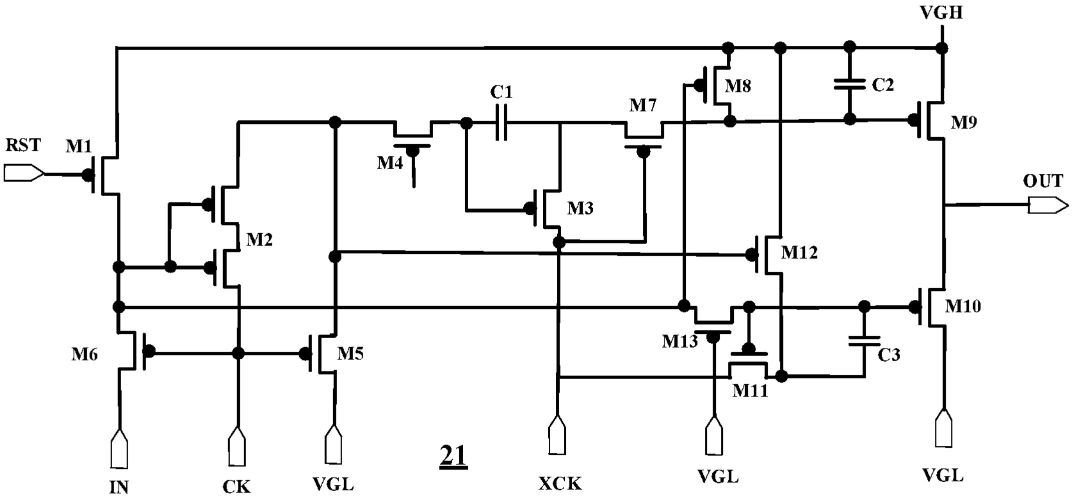
FIG. 2 illustrates a circuit structure of a driving circuit of an exemplary display panel according to various disclosed embodiment of the present disclosure.

FIG. 2 is a schematic structural diagram of a driving circuit of an exemplary display panel consistent with various disclosed embodiments of the present disclosure.

As shown in FIG. 2 and FIG. 1, a driving circuit 21 may also be provided in the display panel, and the driving circuit 21 may be configured to provide a control signal for the pixel circuit 10. The driving circuit 21 may include a plurality of transistors. In the driving circuit 21, some of the transistors may be connected to a clock signal line. The transistors may include the transistor M5, and the transistor M6, etc.

The clock signal line may be configured to provide the clock signal CK for the driving circuit 21. As one of the signals received by the driving circuit 21, the clock signal CK may be outputted according to the clock pulse frequency or at a constant potential.

In one embodiment of the present disclosure, one data writing period of the display panel may include S frames of refresh images, and S>0. The S frames may include a data writing frame and a holding frame. The data writing frame may include a data writing stage. The holding frame may not include a data writing stage and may include a holding stage. For example, one data refresh period of the pixel circuit 10 may include a data writing stage and a holding stage.

Among them, in the data writing stage, the data signal line may write the data signal Vdata to the gate electrode of the driving transistor T0. Simultaneously, the data writing module 14, the driving module 11, and the compensation module 15 may be turned on for a conduction, and the data signal Vdata may be written into the gate electrode of the driving transistor T0. In the holding stage, the data signal line may not write the data signal Vdata to the gate electrode of the driving transistor T0.

It should be noted that, when the pixel circuit 10 is at the holding stage, the driving circuit 21 may provide an invalid pulse signal to the pixel circuit 10 to control the corresponding transistor to turn off for a disconnection. However, when the holding stage is relatively long, the driving circuit 21 may continuously output a same signal for a relatively long time.

On the one hand, if the clock signal CK is outputted at the clock pulse frequency of F1 during the holding stage, and because the driving circuit 21 may output the same signal during the holding stage, the jump of the clock signal CK may not cause the jump of the output signal of the driving circuit 21. Thus, at this time, the clock signal CK may jump at a higher frequency F1, resulting in a greater power consumption.

On the other hand, if the clock signal CK is kept at a constant potential in the holding stage, when the holding stage is relatively long, the driving circuit 21 may continue to output the same signal for a relatively long time, which may cause the transistor in the driving circuit 21 to generate a leakage current accumulation. Accordingly, the output signal may drift, and the output of the transistor of the driving circuit 21 may be unstable.

It should be noted that, when the output signal of the driving circuit 21 drifts to a certain extent, the transistors in some pixel circuits 10 that were originally turned off may gradually tend to turn on. Thus, the leakage current of these transistors may increase rapidly at this time; and the potential of the transistor may change. Further, because the function of the pixel circuit 10 is to generate the driving current required by the light-emitting element 20, when the leakage current of the transistor therein is too large, it may cause the driving current to change, which may in turn cause the display panel to have an uneven light-emission and a flicker during the grayscale switching.

Figure 3:
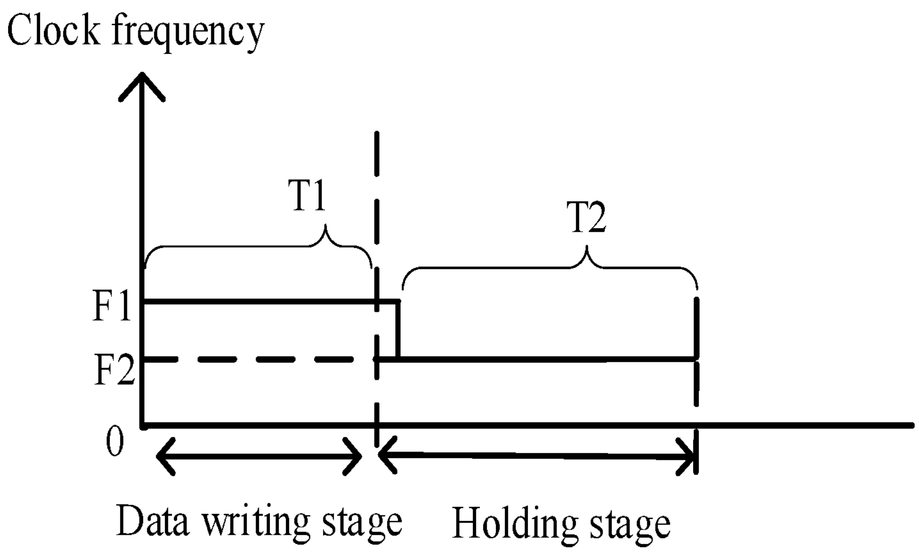
FIG. 3 illustrates a clock frequency of a clock signal of a pixel circuit of an exemplary pixel circuit when the pixel circuit is operated at different operation stages according to various disclosed embodiments of the present disclosure.

Therefore, to solve the above-mentioned problem, in one embodiment, the holding stage of the operation of the pixel circuit 10 may further include N stages arranged in sequence, and N≥1. FIG. 3 is a comparison diagram of the clock pulse frequencies of the pixel circuit 10 operated in different stages. As shown in FIGS. 1-3, when the pixel circuit 10 is operated at the data writing stage, the clock pulse frequency of the clock signal CK may be a first frequency F1. When the pixel circuit 10 is operated in a holding stage, in at least one of the N stages, the clock pulse frequency of the clock signal CK may be a second frequency F2; and F1>F2>0.

It can be understood that when the pixel circuit 10 is operated in the data writing stage, the first clock pulse frequency F1 of the clock pulse signal may be greater than the second clock pulse frequency F2 of at least one stage when the pixel circuit 10 is operated in the holding stage. For example, relative to the data writing stage of the pixel circuit 10, a frequency reduction may be performed in at least one stage when the pixel circuit 10 is in the holding stage. Compared with the jump of the higher first frequency F1, the power consumption may be reduced.

At the same time, when the frequency is reduced, it may ensure that the reduced second frequency F2 is greater than 0. Thus, the issue that the output signal of the driving circuit 21 is unstable caused by the leakage current, etc. when the second frequency F2 is 0 and the driving circuit 21 is in the same state for a long time caused by the clock signal CK not to jump may be avoided. In other words, the luminescence unevenness of the display panel and the occurrence of flicker during the grayscale switching may be avoided.

Therefore, in the embodiments of the present disclosure, when the pixel circuit 10 is operated in the holding stage, in at least one of the N stages, the clock pulse frequency of the clock signal CK may be the second clock pulse frequency F2. F2 may be greater than 0, and F2 may be less than the first clock pulse frequency F1 of the clock signal CK during the data writing stage. Therefore, when the pixel circuit 10 is operated in the holding stage, the clock signal CK may be outputted at a certain pulse frequency, the issue that the output signal of the driving circuit 21 is unstable caused by the leakage current, etc. when the transistor of the driving circuit 21 is kept at the same state for a long time may be avoided. On the other hand, the clock pulse frequency of the clock signal CK in the holding stage may be relatively low, and the power consumption may be reduced.

Referring to FIGS. 1 to 3, during a data refresh period of the pixel circuit 10 of the display panel, the time length when the clock pulse frequency of the clock signal CK is the first frequency F1 may be set to be T1. The time length when the clock pulse frequency of the clock signal CK is the second frequency F2 may be set to T2. T1 may be less than T2.

It can be understood that, when the pixel circuit 10 is operated at the holding stage for a long time, it may mean that the display panel may be operated at a low frequency state. When the display panel is operated at the low frequency state, it may be necessary to ensure that the clock signal CK has a certain pulse such that some transistors in the driving circuit 21 may be maintained at the normal operation, and the unstable output signal issue of the driving circuit 21 caused by a long-term leakage current may be avoided. At the same time, the frequency of the clock signal CK may be required to be relatively low. Thus, the power consumption may be reduced.

Therefore, it may be possible to keep the clock signal CK at the second frequency F2 for a longer period of time, and maintaining the clock signal CK at the first frequency F1 may be necessary in the data writing stage. However, when the pixel circuit 10 is operated in the holding stage, the clock signal CK may not necessarily need to be maintained at the first frequency F1. Therefore, the time length T2 when the clock signal CK is kept at the second frequency F2 may be set to be greater than the time length T1 when the clock signal CK is kept at the first frequency F1. Accordingly, the time length T1 when the clock signal CK is kept at first frequency F1 may not be too long, which may facilitate to reduce the power consumption of the display panel.

Based on the foregoing analysis, it can be seen that when the pixel circuit 10 is operated in the holding stage, the clock signal CK may not need to be maintained at a high clock signal frequency. On the contrary, when the clock signal CK is at a relatively low clock signal frequency, the pulse jump may be maintained, and the effect of reducing the power consumption and stabilizing the output signal of the driving circuit 21 may be better achieved.

However, when the clock signal CK is operated normally, for example, similar to the situation when the pixel circuit 10 is operated in the data writing stage, when the clock signal frequency of the clock signal CK is the first frequency F1, the clock signal frequency (i.e., the first frequency F1) may be a significantly high frequency. If the first frequency F1 is changed abruptly and reduced to a lower frequency, the state of the transistors in the driving circuit 21 may be unstable.

Figure 4:
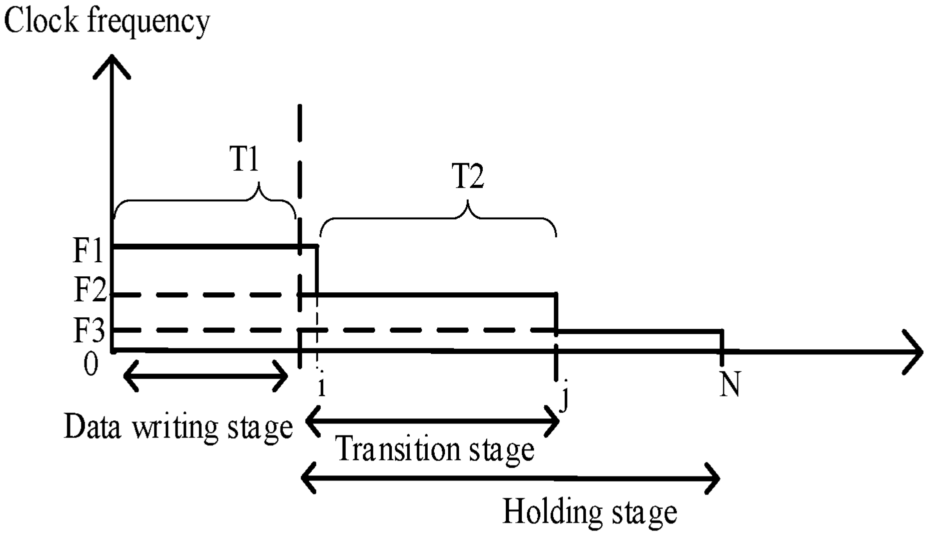
FIG. 4 illustrates a clock frequency of a clock signal of a pixel circuit of another exemplary pixel circuit when the pixel circuit is operated at different operation stages according to various disclosed embodiments of the present disclosure.

For such a reason, referring to FIGS. 1-2 and FIG. 4, in this disclosure, a transition stage may also be provided to solve the problem that the sudden change of the clock signal frequency which may cause the state of the transistor in the driving circuit 21 to be unstable. For example, on the basis that the first frequency F1 is greater than the second frequency F2, and the second frequency F2 is greater than 0, the pixel circuit 10 may also include at least one stage among the N stages when the pixel circuit 10 is operated in the holding stage. In the at least one stage, the clock pulse frequency of the clock signal CK may be a third frequency F3, and F2>F3≥0.

The implementation process of the transition stage may be to first reduce the clock signal CK from a high clock pulse frequency (i.e., the first frequency F1) to a medium clock pulse frequency (i.e., the second frequency F2), and then maintain it for a period of time, and then change from the medium clock pulse frequency to (i.e., the second frequency F2) to a lower clock pulse frequency (i.e., the third frequency F3). Thus, the clock signal frequency may be transited smoothly, and the state of the transistors of the drive circuit 21 may also be transited smoothly. Accordingly, the issue that the transistors are unstable may be avoided.

In another embodiment, referring to FIGS. 1-2 and FIG. 4, when the pixel circuit 10 is operated in the holding stage, in the i-th stage of the N stages, the clock pulse frequency of the clock signal CK may be the second frequency F2; and in the j-th stage of the N stages, the clock pulse frequency of the clock signal CK may be the third frequency F3; and 1≤i≤j≤N.

It is understandable that, to prevent the unstable state of the transistor in the driving circuit 21 caused by the sudden change of the clock signal frequency, because the clock pulse frequency may need to maintain a smooth transition from high frequency to low frequency. For the time sequence of the corresponding clock pulse frequency, it may also need to follow this rule. For example, when the pixel circuit 10 is operated in N stages, from the first stage to the N-th stage, the clock pulse frequency from the corresponding number of stages occupied by different stages may show a decreasing trend as a whole to improve the stability function of the transistors of the pixel circuit 10.

Figure 5:
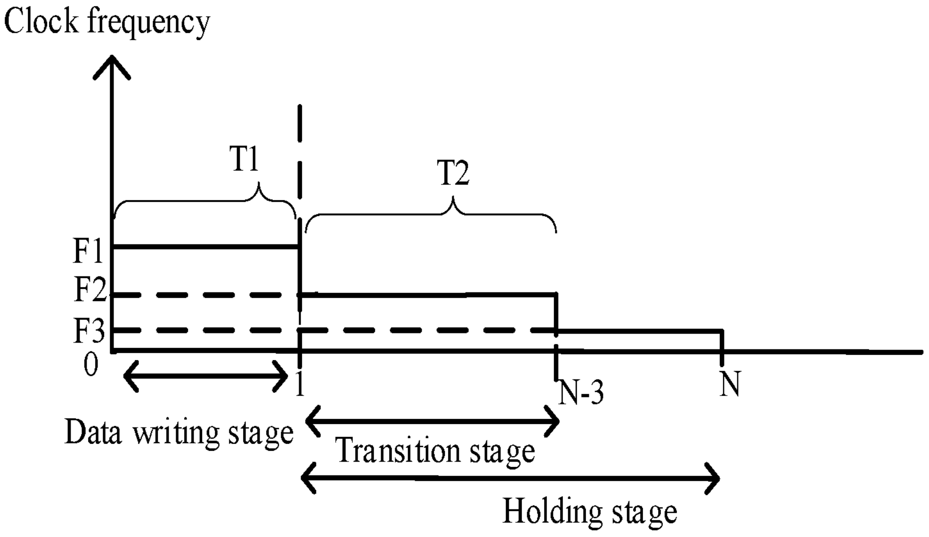
FIG. 5 illustrates a clock frequency of a clock signal of a pixel circuit of another exemplary pixel circuit when the pixel circuit is operated at different operation stages according to various disclosed embodiments of the present disclosure.
Figure 6:
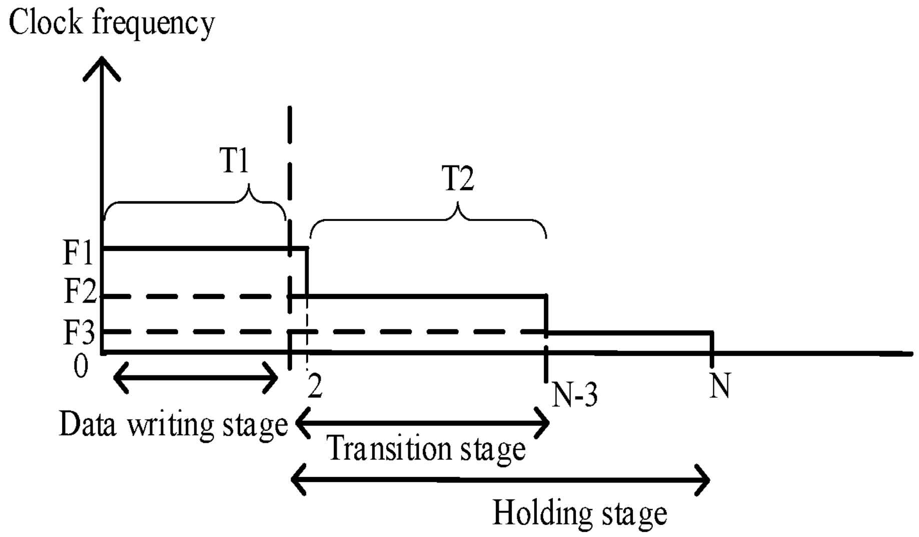
FIG. 6 illustrates a clock frequency of a clock signal of a pixel circuit of another exemplary pixel circuit when the pixel circuit is operated at different operation stages according to various disclosed embodiments of the present disclosure.

FIG. 5 and FIG. 6 illustrate schematic diagrams of exemplary relationships between the stage numbers of the N stages and the clock pulse frequencies when the pixel circuit 10 is operated in the holding stages. In FIG. 5, i=1 and j=N−3, and in FIG. 6, i=2 and j=N−3.

Further, referring to FIGS. 1-4, on basis of setting the clock pulse frequency of the clock signal CK to at least include the first frequency F1, the second frequency F2, and the third frequency F3 during a data refresh period of the pixel circuit 10, the time length T1 when the clock pulse frequency of the clock signal CK is at the first frequency F1 may be set to be less than the time length T2 when the clock pulse frequency is at the second frequency F2; and the time length T2 when the clock pulse frequency of the clock signal CK may be set to be less than the time length T3 when the clock pulse frequency of the clock signal CK is at the third frequency F3.

For example, for the setting of the time length of the clock pulse frequency in a single data refresh period, the time length T1 of the first frequency F1, the time length T2 of the second frequency F2, and the time length T3 of the third frequency F3 may be sequentially increased. Such a setting may not only ensure a smooth transition of the clock pulse frequency of the clock signal CK, but also make the stage with a lower clock pulse frequency stay for a longer time to facilitate to reduce the power consumption.

In another embodiment, in one data refresh period of the pixel circuit 10, the difference between the time length T1 when the clock pulse frequency of the clock signal CK is the first frequency F1 and the time length T2 when the clock pulse frequency is the second frequency F2 may be set as d1, and the difference between the time length T2 when the clock pulse frequency of the clock signal CK is the second frequency F2 and the time length T3 when the clock pulse frequency of the clock signal CK of the third frequency F3 may be set d2, and d1 may be less than d2.

The mathematical expression of the relationship may be that d1=T2−T1, d2=T3−T2, and d1<d2. It can be understood that, based on the foregoing analysis, the setting of the first frequency F1 may be to ensure the normal operation of the pixel circuit 10 in the data writing stage, and the setting of the second frequency F2 may be to ensure the smooth transition of the clock pulse frequency. The function of setting the third frequency F3 may be to reduce the power consumption of the display panel. By setting d1 to be smaller than d2, each clock pulse frequency may better perform its respective function.

It should also be noted that, in a data refresh period during which the pixel circuit 10 is in operation, on the basis of setting the clock pulse frequency of the clock signal CK to at least include the first frequency F1, the second frequency F2, and the third frequency F3, when F3>0, the ratio between the clock pulse frequency F1 when the pixel circuit 10 is operated in the data writing stage and the second clock pulse frequency F2 when the pixel circuit 10 is operated in the holding stage and the clock pulse frequency of at least one of the N stages is the second frequency F2 may be set as d3. Further, the ratio of clock pulse frequencies of two different stages when the pixel circuit 10 is operated in the holding stage, for example, the ratio between the second frequency F2 and the third frequency F3, may be set as d4. In one embodiment, d3=F1/F2 d4=F2/F3.

It is understandable that, when the pixel circuit 10 is operated in the data writing stage, the clock pulse frequency F1 of the clock signal CK may be very high, and when the pixel circuit 10 is operated in the holding stage, the clock pulse frequency (including the second frequency F2 and the third frequency F3) of the clock signal CK of at least one of the N stages may be relatively low. Thus, if d3=F1/F2=d4=F2/F3, it may possible that F1-F2, i.e., the difference between the clock pulse frequency F1 of the clock signal CK when the pixel circuit 10 is operated in the data writing stage and the second frequency F2 when the pixel circuit 10 is operated the holding stage and the clock pulse frequency of at least one state of the N stage is the second frequency F2 may be significantly greater than F2-F3, i.e., the difference between two different clock pulse frequencies of two different stages of the N stages when the pixel circuit 10 is operated at the holding stage.

For example, when the pixel circuit 10 is operated in the data writing stage, the clock pulse frequency F1 of the clock signal CK drops to stage in which the pixel circuit 10 is operated in the holding stage, the difference between the clock pulse frequency F1 of the clock signal CK when the pixel circuit 10 is operated in the data writing stage and the second frequency F2 when the pixel circuit 10 is operated the holding stage and the clock pulse frequency of at least one state of the N stage is the second frequency F2 may be substantially large.

Therefore, in the present disclosure, the relationship d3=F1/F2≤d4=F2/F3 may cause d3=F1/F2 to be relatively small such that the difference between the first frequency F1 and the second frequency F2 may not be too large, and the unstable state of the transistor caused by a relatively large difference between the frequency F1 and the second frequency F2 may be avoided. For example, such a setting may facilitate to ensure a smooth transition of the transistor state, and the stability of the driving circuit 21 may be improved.

When the pixel circuit 10 is operated in the holding stage and the clock pulse frequency of the clock signal CK at least one of the N phases is the third frequency F3=0, there may be no pulse change in the third frequency at this time. Thus, when the pixel circuit 10 is operated in the holding stage, the clock signal CK corresponding to the third frequency F3 may be a constant voltage signal. At this time, it may be set that at least one transistor in the driving circuit 21 controlled by the clock signal CK is at the on state under the control of the constant voltage signal.

Further, to avoid the problem of excessive leakage current accumulated on the transistor controlled by the clock signal CK when the pixel circuit 10 is operated in the holding stage, which may cause the output of the driving circuit 21 to be unstable, when the clock signal CK is a constant voltage signal, the constant voltage signal may be set to a voltage that may control these transistors to remain on to ensure that even if the state of the drive circuit 21 is refreshed, the unstable output caused by the accumulation of local charges may be avoided.

Figure 7:
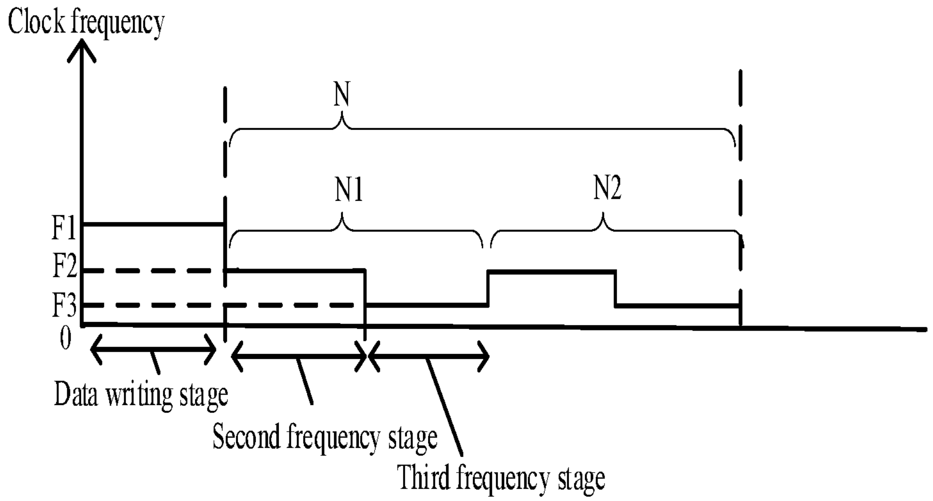
FIG. 7 illustrates a clock frequency of a clock signal of a pixel circuit of another exemplary pixel circuit when the pixel circuit is operated at different operation stages according to various disclosed embodiments of the present disclosure.

FIG. 7 is a schematic diagram of the optional change of the clock pulse frequency of the clock signal CK when the pixel circuit 10 is operated in the holding stage in another embodiment of the present disclosure. Referring to FIGS. 1-2 and FIG. 7, in this embodiment, the N stages may include N1 stages and N2 stages arranged in sequence. The N1 stages may include a second frequency stage and a third frequency stage arranged in sequence, and the N2 stages may include the second frequency stage arranged and the third frequency stage in sequence. In the second frequency stage, the clock pulse frequency of the clock signal CK may be the second frequency F2, and in the third frequency stage, the clock pulse frequency of the clock signal CK may the third frequency F3.

For such a configuration, when the pixel circuit 10 is operated in the N stages of the holding stage, the clock pulse frequency of the clock signal CK may first drop from the first frequency F1 to the second frequency F2, and then to the third frequency F3. After maintaining at the third frequency F3 for a period of time, it may raise to the second frequency F2, and then may drop to the third frequency F3.

Therefore, it may avoid that the frequency of the clock signal CK is too low when the frequency is kept at a low frequency (that is, the third frequency F3) for a long time. If frequency of the clock signal Cl is too low, the transistor may generate the leakage current for a long time, and the output signal of the driving circuit 21 may be shifted. As a result, the off-state leakage current of the transistor in the pixel circuit 10 may be increased, which may cause the display unevenness of the display panel or the flicker problem when the grayscale changes.

Figure 8:
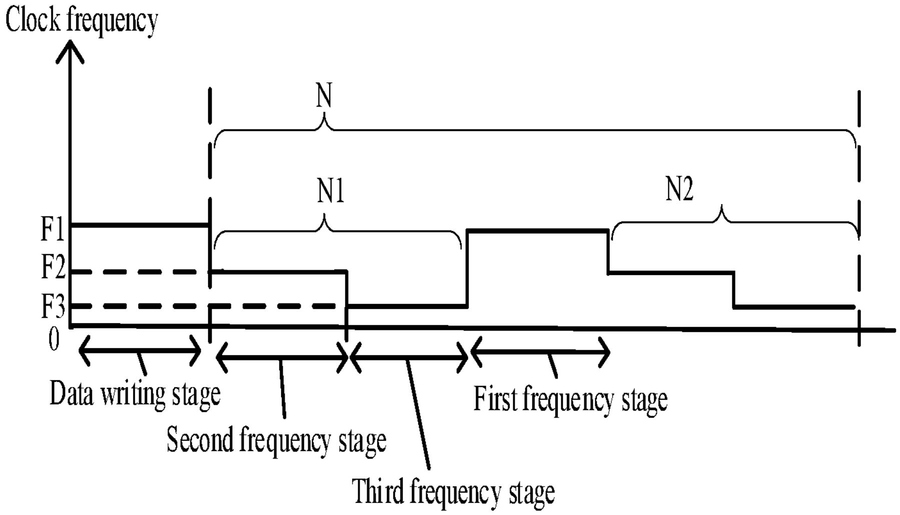
FIG. 8 illustrates a clock frequency of a clock signal of a pixel circuit of another exemplary pixel circuit when the pixel circuit is operated at different operation stages according to various disclosed embodiments of the present disclosure.

On this basis, referring to FIGS. 1-2 and FIG. 8, the first frequency stage may also be included between the N1 stages and the N2 stages. In the first frequency stage, the clock pulse frequency of the clock signal CK may be the first frequency F1.

It is understandable that the first frequency F1 may be a very high frequency. Such a setting may allow the first frequency F1 to pull the change of the transistor when the third frequency F3 switches to the high frequency again, or when the third frequency F3 switches to the first frequency F1 and then drops down, and the leakage current accumulation on the transistor may be better avoided.

Referring to FIGS. 1-2, in another embodiment, the data refresh frequency of the pixel circuit 10 may include a first data refresh frequency F11 and a second data refresh frequency F22; and F11>F22.

When the pixel circuit 10 is operated at the first data refresh frequency F11, the holding stage may include X1 second frequency stages and Y1 third frequency stages. When the pixel circuit 10 is operated at the second data refresh frequency F22, the holding stage may include X2 second frequency stages and Y2 third frequency stages. X1<X2, and/or Y1<Y2.

In the second frequency stage, the clock pulse frequency of the clock signal CK may be the second frequency F2, and in the third frequency stage, the clock pulse frequency of the clock signal CK may be the third frequency F3.

It should be noted that the first data refresh frequency F11 may be a low frequency, such as 10 Hz, and the second data refresh frequency F22 may be a low frequency, such as 1 Hz. When the second data refresh frequency F22 is compared with the first data refresh frequency F11, the time of the holding stage of the pixel circuit 10 may be longer, and the problem of unstable output signal of the driving circuit 21 may be more serious at this time.

Thus, by setting more second frequency stages or third frequency stages at the second data refresh frequency F22, the frequency of the clock signal CK may be changed more frequently at the second data refresh frequency F22. Thus, the unstable output signal of the driving circuit 21 caused by a too long holding time may be avoided.

Further, referring FIGS. 1-2, in another exemplary display panel of the present disclosure, the data refresh frequency of the pixel circuit 10 may include a first data refresh frequency F11 and a second data refresh frequency F22, and F11>F22.

When the pixel circuit 10 is operated at the first data refresh frequency F11, in a holding stage, the time length when the clock pulse frequency of the clock signal CK is at the second frequency F2 may be L1. When the pixel circuit 10 is operated at the second data refresh frequency F22, in a holding stage, the time length when the clock pulse frequency of the clock signal CK is at the second frequency F2 may be L2. In one embodiment, L1<L2.

It can be understood that when the pixel circuit 10 is operated at the second data refresh frequency F22, compared with the clock signal CK, maintaining the relatively high frequency of the second data refresh frequency F22 for a longer period of time may prevent the problem of unstable output signal of the driving circuit 21 caused by the clock signal CK being maintained at the low frequency F33 for a long time.

Further, when the pixel circuit 10 is operated at the first data refresh frequency F11, in a holding stage, the time length when the clock pulse frequency of the clock signal CK being the third frequency F3 may be L3. When the pixel circuit 10 is operated at the data refresh frequency F22, in one holding stage, the time length when the clock pulse frequency of the clock signal CK is at the third frequency F3 may be L4. In one embodiment, |L1−L3|>|L2−L4|.

It can be understood that, as mentioned above, in a holding stage, the clock pulse frequency of the clock signal CK may remain at the third frequency F3 for a longer time. When the second data refresh frequency F22 is lower, the second frequency F2 time may also be longer. Therefore, the time occupied by the second frequency F2 may be longer at the low frequency, while the time occupied by the third frequency F3 may be shorter. Thus, the time relationship can be set as |L1−L3|>|L2−L4|.

In some embodiments, referring to FIGS. 1-2, the source electrode or the drain electrode of the first transistor T1 included in the pixel circuit 10 may be connected to the gate electrode of the driving transistor T0. The driving circuit 21 may be configured to provide a control signal for the first transistor T1. The driving circuit 21 may be connected to the gate electrode of the driving transistor T0 to provide a control signal to the pixel circuit 10. Such a configuration may ensure that the gate potential of the driving transistor T0 may be stable.

Figure 9:
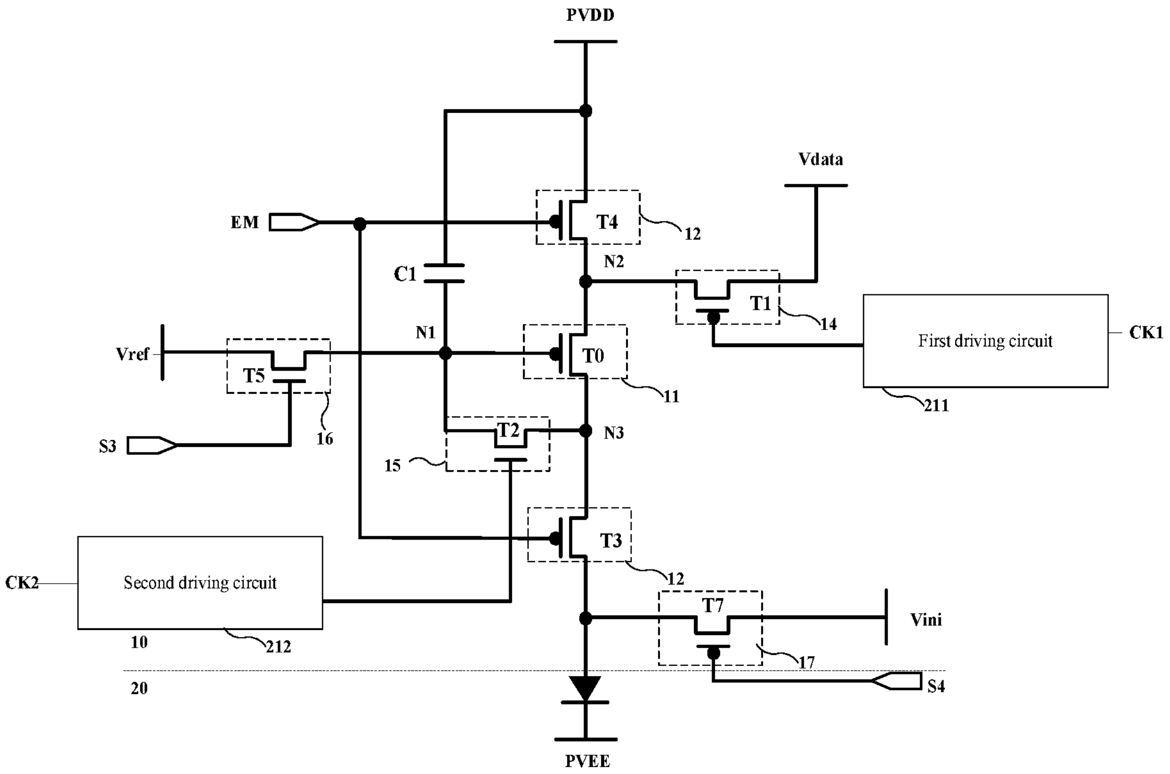
FIG. 9 illustrates a clock frequency of a clock signal of a pixel circuit of another exemplary pixel circuit when the pixel circuit is operated at different operation stages according to various disclosed embodiments of the present disclosure.

In other embodiments, referring to FIGS. 1-2 and FIG. 9, the pixel circuit 10 may include a first transistor T1 and a second transistor T2. The source electrode or the drain electrode of the first transistor T1 may be connected to the driving transistor T0. The source electrode or the drain electrode of the second transistor T2 may be connected to the source electrode or the drain electrode of the driving transistor T0.

The driving circuit 21 may include a first driving circuit 211 and a second driving circuit 212. The first driving circuit 211 may be configured to provide a control signal (i.e., the first scan signal S1) for the first transistor T1, and the second driving circuit 212 may be configured to provide a control signal for the second transistor T2 (i.e., the second scan signal S2).

The clock signal line may also include a first clock signal line and a second clock signal line. The first clock signal line may provide the first clock signal CK1 for the first driving circuit 211, and the second clock signal line may provide the second clock signal CK2 for the second driving circuit 212. When the pixel circuit 10 is operated in the holding stage, the time length when the clock pulse frequency of the first clock signal CK1 is the second frequency F2 may be longer than the time length when the clock pulse frequency of the second clock signal CK2 is the second frequency F2.

It should be noted that the gate electrode of the driving transistor T0 may be configured to write the data signal Vdata, and the data signal Vdata may be a crucial factor for generating the driving current. Therefore, whether the gate potential of the driving transistor T0 is stable or not may be an important factor for affecting the light-emitting brightness of the light-emitting element 20.

To fully ensure that the gate potential of the driving transistor T0 is stable, the time when the first clock signal CK1 is set to the higher second frequency F2 may be longer to avoid the first clock signal CK1 from falling at the low-frequency third frequency F3 for too long. If the time is too long, the output signal of the driving transistor T0 may change, and the first transistor T1 may not be completely turned off when the first transistor T1 is at the off state, and the leakage current may greatly affect the gate potential of the driving transistor T0.

The second transistor T2 may not write a signal to the gate electrode of the driving transistor T0. Even in some cases, when the pixel circuit 10 is operated in the holding stage, the second transistor T2 may be turned on for a conduction. Even if the output signal of the second driving circuit 212 may have a jump change, the time for continuously outputting the same signal may not be too long.

On this basis, when the pixel circuit 10 is operated in the holding stage, the time length when the clock pulse frequency of the first clock signal CK1 is the third frequency F3 may be set to be less than the time length when the clock pulse frequency of the second clock signal CK2 is the third frequency F3. With such a configuration, the time length when the first clock signal CK1 is at the third frequency F3 may be relatively small to ensure that the first transistor T1 is completely turned off when it is at the off state.

Figure 10:
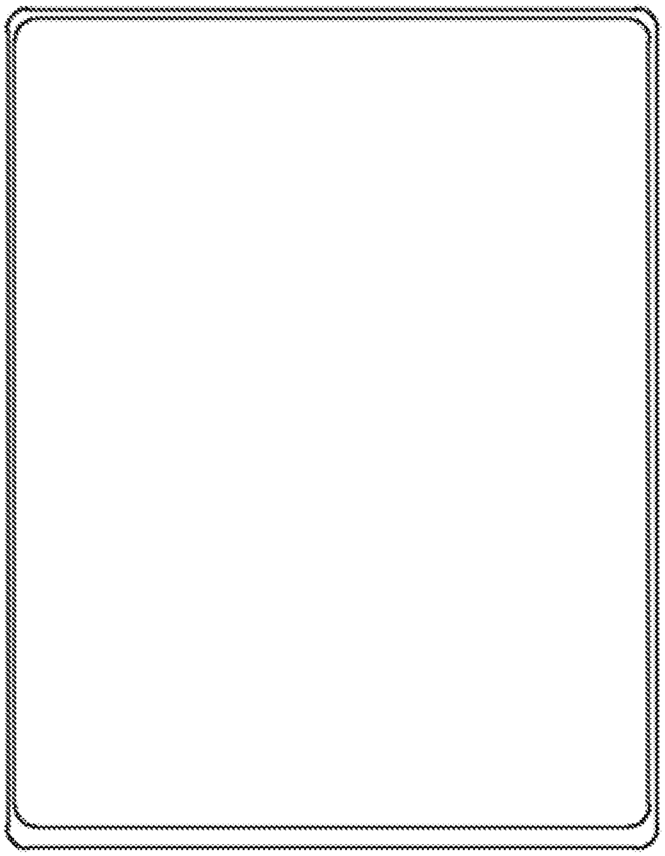
FIG. 10 illustrates an exemplary display panel according to various disclosed embodiments of the present disclosure.

The display panel according to the embodiments of the present disclosure is described in detail above with reference to FIGS. 1-9. The present disclosure also provides a display device. FIG. 10 illustrates an exemplary display device according to various disclosed embodiments of the present disclosure.

As shown in FIG. 10, the display device may include a display panel; and the display panel may be a present disclosed display panel. Further, the display device may include at least one of a wearable device, a camera, a mobile phone, a tablet computer, a display screen, a TV set, and a vehicle-mounted display terminal, etc. The display device may include the display panel provided in the above-mentioned embodiments. Thus, the display device may have all the beneficial effects of the above-mentioned display panels.

Thus, in the display panel and the display device provided by the embodiments of the present disclosure, when the pixel circuit is operated in the holding stage, it may include N stages. In at least one of the N stages, the clock pulse frequency of the clock signal may be F2, and F2 may be greater than 0, and F2 may be less than the clock pulse frequency F1 of the clock signal in the data writing stage. Thus, when the pixel circuit is in operation, the clock signal may be output at a certain pulse frequency, which may prevent the transistors of the driving circuit from remaining in the same state for a long time, and the problem of unstable output signal caused by factors such as a leakage current may be avoided. On the other hand, the clock pulse frequency of the clock signal of the pixel circuit operating in the holding stage may also be relatively low, and the power consumption may be reduced.

In addition, the term "and/or" in this article is only an association relationship describing associated objects, which means that there may be three kinds of relationships, for example, A and/or B, which may mean that A alone exists, and A and B exist at the same time, or B exists alone. In addition, the character "/" in this text generally indicates that the associated objects before and after are in an "or" relationship.

It should be understood that in the embodiment of the present disclosure, "B corresponding to A" may mean that B is associated with A, and B can be determined according to A. However, it should also be understood that determining B based on A does not mean that B is determined only based on A, and B may also be determined based on A and/or other information.

The above are only specific embodiments of the present disclosure, but the protection scope of the present disclosure is not limited thereto. Any person skilled in the art can easily think of various equivalent modifications or changes within the technical scope disclosed in the present disclosure. Equivalent modifications or replacements should all be covered within the protection scope of the present disclosure. Therefore, the protection scope of the present disclosure should be subject to the protection scope of the claims.

What is claimed is:

1. A display panel, comprising:
a pixel circuit;
a driving circuit configured to provide a control signal to the pixel circuit; and
a clock signal line configured to provide a clock signal for the driving circuit;
wherein:
a data refresh period of the pixel circuit includes a data writing stage and a holding stage, and the holding stage includes N stages arranged in sequence, N≥1;
when the pixel circuit is operated in the data writing stage, a clock pulse frequency of the clock signal is a first frequency F1;
when the pixel circuit is operated in the holding stage, in at least one stage of the N stages, the clock pulse frequency of the clock signal is a second frequency F2, F1>F2>0;
the pixel circuit includes a driving transistor, a first transistor, and a second transistor;
the driving circuit includes:
a first driving circuit configured to provide a control signal to the first transistor; and
a second driving circuit configured to provide a control signal to the second transistor;
the clock signal line includes:
a first clock signal line configured to provide a first clock signal to the first driving circuit; and
a second clock signal line configured to provide a second clock signal to the second driving circuit;
when the pixel circuit is operated in the holding stage, a time length when a clock pulse frequency of the first clock signal is the second frequency F2 is H1, a time length when a clock pulse frequency of the second clock signal is the second frequency F2 is H2, and H1>H2≥0.

2. The display panel according to claim 1, wherein:
a source electrode or a drain electrode of the first transistor is connected to a gate electrode of the driving transistor;
a source electrode or a drain electrode of the second transistor is connected to a source electrode or a drain electrode of the driving transistor.

3. The display panel according to claim 2, wherein the second transistor does not write a signal to the gate electrode of the driving transistor.

4. The display panel according to claim 2, wherein the pixel circuit includes:
a data writing module connected between the data signal line and the source electrode of the driving transistor; and/or
a compensation module connected between the gate electrode of the driving transistor and the drain electrode of the driving transistor; and/or
a reset module connected between a reset signal terminal and the gate electrode of the driving transistor; and/or
an initialization module connected between an initialization signal terminal and a light-emitting element of the display panel; and/or
a light-emitting control module configured to selectively allow a light-emitting element to enter a light-emitting stage.

5. The display panel according to claim 1, wherein:
the N stages includes at least one stage, a clock pulse frequency of the clock signal is a third frequency F3, and $F2>F3\geq 0$;
when the pixel circuit is operated in the holding stage, a time length when the clock pulse frequency of the first clock signal is the third frequency F3 is H3, a time length when the clock pulse frequency of the second clock signal is the third frequency F3 is H4, and $H4>H3\geq 0$.

6. The display panel according to claim 1, wherein:
in the data refresh period, a time length when the clock pulse frequency of the clock signal is the first frequency F1 is less than a time length when the clock pulse frequency of the clock signal is the second frequency F2.

7. The display panel according to claim 1, wherein:
the driving circuit includes a plurality of transistors; and
in the driving circuit, at least one of the plurality of transistors are connected to the clock signal line.

8. A display device comprising the display panel of claim 1.

9. A display panel, comprising:
a pixel circuit;
a driving circuit configured to provide a control signal to the pixel circuit; and
a clock signal line configured to provide a clock signal for the driving circuit;
wherein:
a data refresh period of the pixel circuit includes a holding stage, and the holding stage includes N stages arranged in sequence, $N\geq 1$;
when the pixel circuit is operated in the holding stage, in at least one stage of the N stages, a clock pulse frequency of the clock signal is a second frequency F2, $F2>0$;
the pixel circuit includes a driving transistor, a first transistor, and a second transistor;
the driving circuit includes:
a first driving circuit configured to provide a control signal to the first transistor; and
a second driving circuit configured to provide a control signal to the second transistor;
the clock signal line includes:
a first clock signal line configured to provide a first clock signal to the first driving circuit; and
a second clock signal line configured to provide a second clock signal to the second driving circuit;
when the pixel circuit is operated in the holding stage, a time length when a clock pulse frequency of the first clock signal is the second frequency F2 is H1, a time length when a clock pulse frequency of the second clock signal is the second frequency F2 is H2, and $H1>H2\geq 0$.

10. The display panel according to claim 9, wherein:
a source electrode or a drain electrode of the first transistor is connected to a gate electrode of the driving transistor;
a source electrode or a drain electrode of the second transistor is connected to a source electrode or a drain electrode of the driving transistor.

11. The display panel according to claim 10, wherein the second transistor does not write a signal to the gate electrode of the driving transistor.

12. The display panel according to claim 10, wherein the pixel circuit includes:
a data writing module connected between the data signal line and the source electrode of the driving transistor; and/or
a compensation module connected between the gate electrode of the driving transistor and the drain electrode of the driving transistor; and/or
a reset module connected between a reset signal terminal and the gate electrode of the driving transistor; and/or
an initialization module connected between an initialization signal terminal and a light-emitting element of the display panel; and/or
a light-emitting control module configured to selectively allow a light-emitting element to enter a light-emitting stage.

13. The display panel according to claim 9, wherein:
the driving circuit includes a plurality of transistors; and
in the driving circuit, at least one of the plurality of transistors are connected to the clock signal line.

14. A display device comprising the display panel of claim 9.

15. A display panel, comprising:
a pixel circuit;
a driving circuit configured to provide a control signal to the pixel circuit; and
a clock signal line configured to provide a clock signal for the driving circuit;
wherein:
a data refresh period of the pixel circuit includes a holding stage, and the holding stage includes N stages arranged in sequence, $N\geq 1$;
when the pixel circuit is operated in the holding stage, in at least one stage of the N stages, a clock pulse frequency of the clock signal is a third frequency F3, $F3=0$;
the pixel circuit includes a driving transistor, a first transistor, and a second transistor;
the driving circuit includes:
a first driving circuit configured to provide a control signal to the first transistor; and
a second driving circuit configured to provide a control signal to the second transistor;
the clock signal line includes:
a first clock signal line configured to provide a first clock signal to the first driving circuit; and
a second clock signal line configured to provide a second clock signal to the second driving circuit;
when the pixel circuit is operated in the holding stage, a time length when a clock pulse frequency of the first clock signal is the third frequency F3 is H3, a time length when a clock pulse frequency of the second clock signal is the third frequency F3 is H4, and H4>H3≥0.

16. The display panel according to claim 15, wherein:

a source electrode or a drain electrode of the first transistor is connected to a gate electrode of the driving transistor;

a source electrode or a drain electrode of the second transistor is connected to a source electrode or a drain electrode of the driving transistor.

17. The display panel according to claim 16, wherein the second transistor does not write a signal to the gate electrode of the driving transistor.

18. The display panel according to claim 16, wherein the pixel circuit includes:

a data writing module connected between the data signal line and the source electrode of the driving transistor; and/or a compensation module connected between the gate electrode of the driving transistor and the drain electrode of the driving transistor; and/or a reset module connected between a reset signal terminal and the gate electrode of the driving transistor; and/or an initialization module connected between an initialization signal terminal and a light-emitting element of the display panel; and/or a light-emitting control module configured to selectively allow a light-emitting element to enter a light-emitting stage.

19. The display panel according to claim 15, wherein:

the driving circuit includes a plurality of transistors; and in the driving circuit, at least one of the plurality of transistors are connected to the clock signal line.

20. A display device comprising the display panel of claim 15.

* * * * *